UNITED STATES PATENT OFFICE.

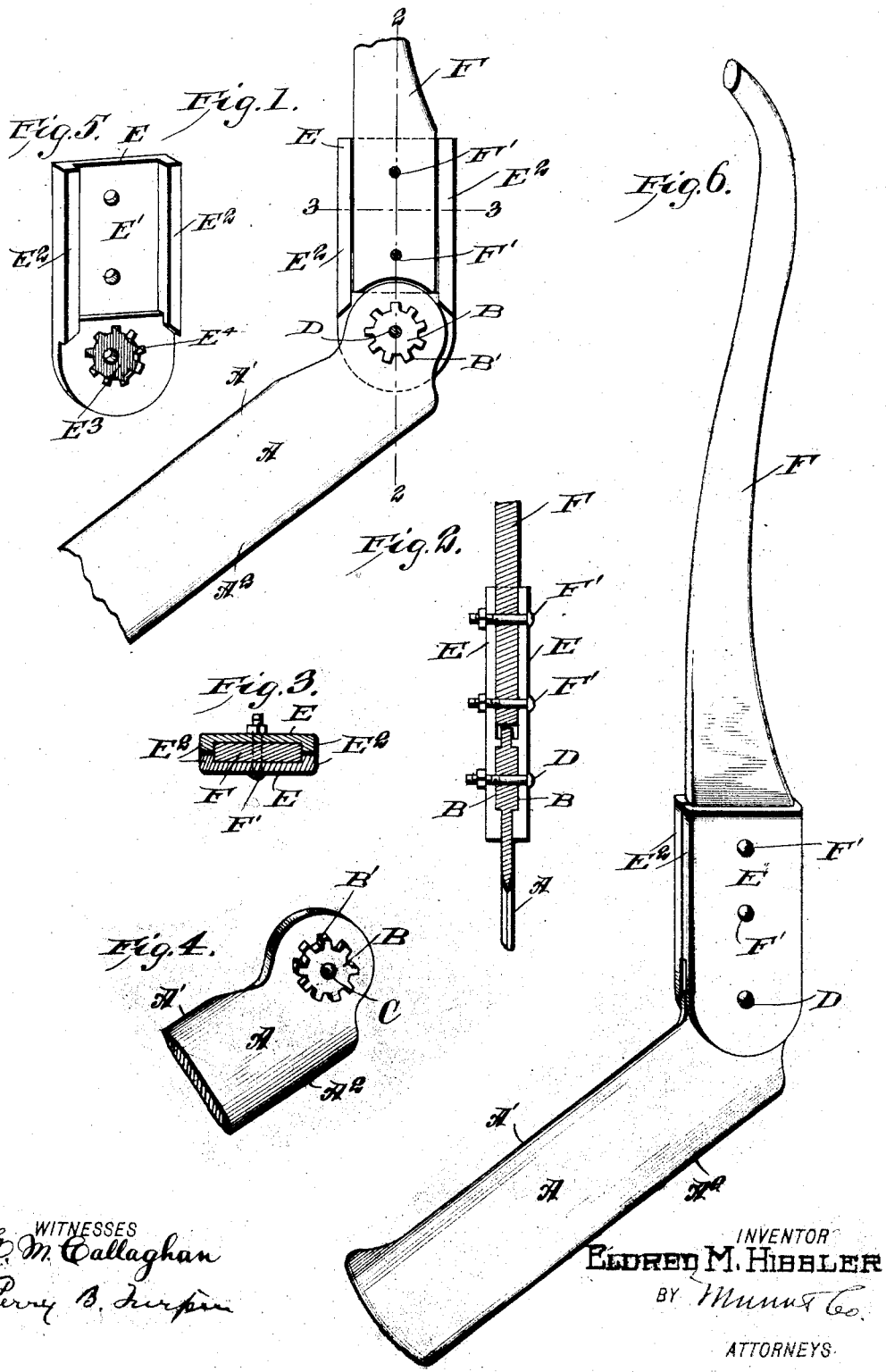

ELDRED M. HIBBLER, OF LYON, MISSISSIPPI.

CANE-CUTTER.

No. 879,048.  Specification of Letters Patent.  Patented Feb. 11, 1908.

Application filed October 1, 1907. Serial No. 395,356.

*To all whom it may concern:*

Be it known that I, ELDRED M. HIBBLER, a citizen of the United States, and a resident of Lyon, in the county of Coahoma and State of Mississippi, have invented certain new and useful Improvements in Cane-Cutters, of which the following is a specification.

My invention is an improvement in cane cutters, and consists in certain novel constructions and combinations of parts as will be hereinafter described and claimed.

In the drawing Figure 1 is a side view, parts being broken away and others removed, showing the joint between the blade and holder. Fig. 2 is a longitudinal section on about line 2—2 of Fig. 1. Fig. 3 is a cross section on about line 3—3 of Fig. 1. Fig. 4 is a detail view of the shank end of the blade. Fig. 5 is a detail perspective view of the inner side of one of the holder plates, and Fig. 6 is a perspective view of the cutter, the handle, holder plates and blade being connected ready for use.

By my invention, I seek to provide a novel means for holding the handle and blade in connection so the blade may be conveniently adjusted to any desired angle and secured at such angle. To this end the blade A, which may have its edges A' and A² both sharpened, has at its shank end on its opposite sides projections B formed with a circular series of tooth-like projections B' concentric with a central opening C for a pivot D, by which a blade is pivotally secured between the opposite holder plates E, as will be more fully described hereinafter. These toothed projections B on opposite sides of the shank of the cutter blade are alike, and the holder plates E which are similarly constructed, so that a description of one will answer for both, are formed on their inner faces with recesses E' which combine to form a socket to receive the handle F, as will be understood from Figs. 1, 2, 3 and 5, said recesses having edge flanges E², which overlap the handle, as best shown in Fig. 3. Near their ends the holder plates are provided in their inner faces with recesses E³ to receive the toothed projections B on the cutter blade. These recesses are provided with a circular series of notches E⁴ radiating from the body of the recesses and adapted to receive the teeth B', as best shown in Fig. 5 of the drawing.

The handle F is held to the holder plates by bolts F' and by releasing these bolts, the holder plates may be spread slightly apart to permit the turning of the toothed projections of the cutter blade to different positions in order to set the cutter blade A at any desired angle, after which by tightening the nuts on the bolts D and F' the blade may be held tightly and securely in any desired adjustment.

The construction is simple and enables the ready adjustment of the parts and also permits the removal of the handle or the blade and the substitution of new ones whenever necessary and also provides, apart from the connecting bolts, a device made in four parts, any one of which may be replaced whenever desired or necessary because of breakage or otherwise.

I claim—

1. A cutter, substantially as herein described, comprising a blade provided at its shank end on its opposite sides with projections having a series of teeth, holder plates recessed at one end to receive a handle and flanged at said end to overlap said handle and provided at their other ends in their inner faces with recesses to receive the toothed projections on the blade shank, and having in said recesses means coöperating with the toothed portions of the blade, and means for holding the sections together, substantially as set forth.

2. The combination of a cutter blade provided at its shank end with a lateral projection having radiating teeth, and a holder plate or section recessed laterally in conformity with the toothed projection of the cutter blade, substantially as set forth.

3. The combination with holder sections and a handle in connection therewith, the holder sections being provided in their inner faces with recesses having notches, and a cutter blade provided at its shank end with toothed projections fitting the notched recesses of the holder plates, substantially as set forth.

4. A cutter blade provided at its shank end with lateral projections having at their edges radial teeth, and holder plates overlapping the shank end of the cutter blade and having means coöperating with the toothed projections thereof whereby to secure the blade in different positions, substantially as set forth.

5. The combination with the opposite holder plates recessed in their inner faces at one end to receive a handle and in their inner faces at their other end to receive a toothed projection on a cutter blade, a handle, a blade having on the opposite faces of the shank end projections corresponding to the recesses in the holder plates, and bolts securing said holder plates in connection with the handle and the cutter blade, substantially as set forth.

ELDRED M. HIBBLER.

Witnesses:
 JAMES McGOVERN,
 G. G. LACY.